3,474,241
COORDINATE TRANSFORMER
Jack Kuipers, 1724 Arbordale Ave.,
Ann Arbor, Mich. 84103
Filed Oct. 6, 1966, Ser. No. 584,919
Int. Cl. G06g 7/22
U.S. Cl. 235—186          1 Claim

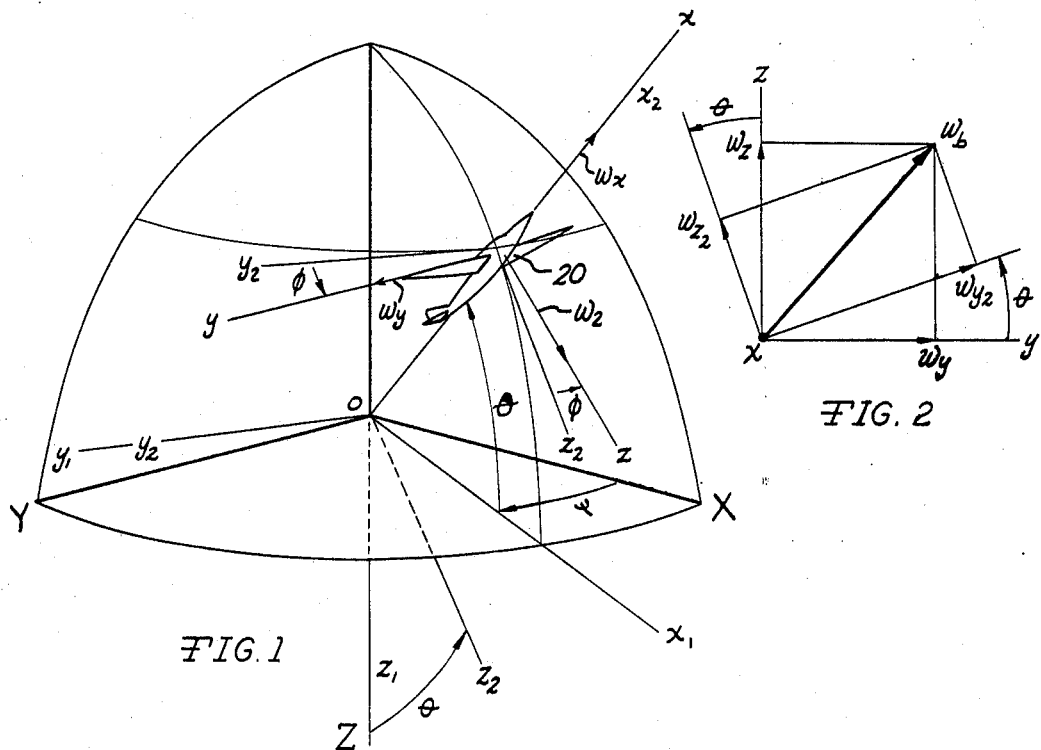
FIG. 1
FIG. 2
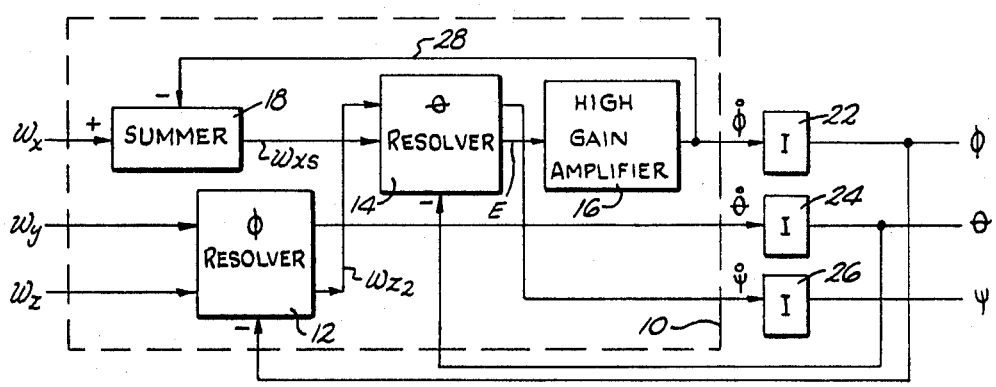
FIG. 4
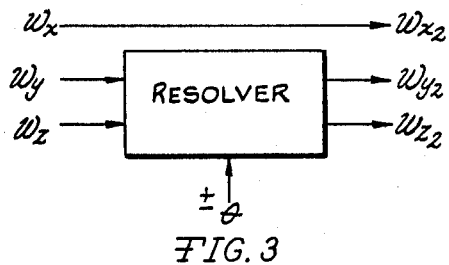
FIG. 3
INVENTOR
JACK KUIPERS
BY Olsen and Stephenson
ATTORNEYS

United States Patent Office 3,474,241
Patented Oct. 21, 1969

ABSTRACT OF THE DISCLOSURE

Apparatus for orienting a body in space wherein two resolvers cooperate with a special feedback arrangement to obtain Euler angle rates of change that can be integrated to determine the instantaneous position of the body.

---

This invention relates generally to apparatus for orienting a body with respect to fixed axes and more particularly for obtaining Euler angle rates of change for the body.

Coordinate transformer apparatus of the type to which this invention relates is particularly useful in connection with defining, measuring and controlling the movement of a body in space, such as aircraft. Such a body is continually moving and this motion is definable with respect to its own orthogonal axes hereinafter referred to as the $x$, $y$ and $z$ axes. These rates of change of the angular position or orientation of the body with respect to these axes can readily be determined by instrumentation on the body. The angular rate of change of the body can be represented by a vector, and analog signals can be generated which are representative of the vector components with respect to the body axes. For example, the analog signals can take the form of voltage changes or changes in pulse rates. However, this vector information concerning the angular rate of change of the body with respect to the body axes is, by itself, meaningless regarding the orientation or instantaneous position of the body, since the positions of the body axes are continually changing. What is desired, is information representative of the position of the body with respect to three orthogonal axes fixed with respect to inertial space, or with respect to the earth, or any sensible reference frame, and hereinafter referred to as the reference X, Y and Z axes. The orientation of the three mutually orthogonal axes of the body can be specified with respect to some arbitrary reference frame, X, Y, Z, by three successive angular rotations. These angular rotations are known as Euler angles. Consequently, if a device which can transform body axes angular rate components into Euler angle rate components can be determined, this Euler angle rate of change can be integrated to determine the instantaneous position of the body. It is therefore desirable to obtain simple, reliable apparatus which is capable of transforming the components of the vector representing the angular rate of change of the body position relative to the body axes into rates of Euler angle change. The principal object of this invention, therefore, is to provide improved coordinate transformer apparatus for accomplishing this desirable objective.

The improved apparatus of this invention utilizes resolvers. The function of a resolver is to operate on two input components of a given vector defined in one coordinate frame and provide output components of the same vector defined in another coordinate frame which is rotated with respect to the first coordinate frame. Thus, a resolver is capable of operating on two input components corresponding to two of the three components of the body axes angular rate vector, $w_b$, along the $x$ and $y$ axes to provide output components of $w_b$ along the new axes, rotated by some angle relative to the input $x$ and $y$ axes. Resolvers capable of performing these functions are well known and can be either electrical, mechanical, electronic AC or DC, analog or digital. In the improved apparatus of this invention, a pair of resolvers are utilized in conjunction with a negative feedback arrangement around a high gain amplifier. It has been found that by virtue of this feedback, the output components from the amplifier and two resolver arrangement will accurately represent Euler angle rates of change. These Euler angle rates of change can then be integrated and the resulting angles fed back where required in the appropriate resolvers so that the coordinate transformer will continuously provide the proper output components of Euler angle rates consistent with the motion of the body. It could thus be said that this invention provides electronic gimballing for a gyroscope.

A further object of this invention, therefore, is to provide a relatively simple coordinate transformer which is reliable in operation over a prolonged service life and is operable to quickly and continuously provide the desired information on Euler angle rates of change. Euler angle rates are desirable only because they can be integrated to give the Euler angles, which is the real objective.

Further objects, features and advantages of this invention will become apparent from a consideration of the following description, the appended claim and the accompanying drawing in which:

FIGURE 1 is a diagrammatic representation of a body in space having orthogonal axes designated $x$, $y$ and $z$ and showing the angular orientation or position of the body in terms of Euler angles, with respect to axes X, Y and Z fixed on the earth;

FIGURE 2 is a diagrammatic representation of the resolution of a vector $w$ having components $w_{y1}$ and $w_{z1}$ into components $w_{y2}$ and $w_{z2}$;

FIGURE 3 is a block diagram representation for the resolution shown in FIG. 2 utilizing a resolver; and FIGURE 4 is a diagrammatic representation of the coordinate transformer apparatus of this invention shown supplied with signals representing the components of $w_b$ along the body axes, and connected to the integrators which continuously indicate the angular position of the body with respect to the reference axes.

With reference to the drawing, the coordinate transformer apparatus of this invention, indicated generally by the broken line box 10 in FIG. 4, is illustrated as consisting of a first resolver 12, a second resolver 14, a high gain amplifier 16 and a summer 18, which is a conventional piece of equipment which functions to add electrical or mechanical signals. Before explaining the transformer 10 in greater detail, reference is made to FIG. 1 which illustrates a body 20, in this case an aircraft, having a longitudinal or roll axis $x$, a lateral or pitch axis $y$ and a body vertical or yaw axis $z$. The body 20 is illustrated with respect to reference space axes X, Y and Z which are in this instance related to the earth geocentric along Z and north along X. In FIG. 1, the Euler angles $\phi$, $\theta$ and $\psi$, the common designations for bank angle, elevation angle, and heading angle, are also shown. The position of the $x$, $y$ and $z$ axes relative to the X, Y and Z axes is conventionally defined as follows:

Consider at the outset that the body axes $x$, $y$ and $z$ are coincident with the reference axes X, Y and Z and by introducing three rotations hereinafter described the general orientation of the body 20 will be defined.

First the $x$ and $y$ axes are rotated through the angle $\psi$ about the Z axis, so as to locate the $x$ and $y$ axes at the imaginary positions indicated at $x_1$ and $y_1$ in FIG. 1. The axis $z$ is at this time coincident with Z.

The $x$ and $z$ axes are then rotated about the $y_1$ axis through the angle $\theta$ so that the $x$, $y$ and $z$ axes are now located at $x_2$, $y_2$ and $z_2$, respectively.

Finally, the $y$ and $z$ axes are rotated about the $x_2$ axis through the angle $\phi$ to locate the axes $x$, $y$ and $z$ as shown. The body 20 is shown in the drawing translated from point 0 only for the purpose of drawing clarity. This translation is not important in this invention which deals only with angles.

The above described sequence is illustrative of twelve rotational sequences that are known and any one of which can be utilized in the apparatus 10 of this invention for obtaining particular Euler angle rates. It is to be understood therefore that this described sequence is illustrative only and that this invention is of a scope to encompass the other eleven sequences as well.

Well known instrumentation can be provided on the body 20, for measuring the components of the angular rate of change of the body 20 along the body $x$, $y$ and $z$ axes, respectively, and these components are represented in FIG. 4 by the designations $w_x$, $w_y$ and $w_z$. However, these vector components are relatively meaningless for orienting the body 20 and controlling its movement, since the position of the $x$, $y$ and $z$ axes is in general constantly changing as the body 20 maneuvers in space.

In the apparatus 10, the resolver 12 is supplied with the input components $w_y$ and $w_z$. The resolver 12 is under the control of the output from an integrator 22 connected to the transformer 10 so that the resolver 12 will continually provide output components $w_{z2}$ and $\dot{\theta}$, where $w_{z2}$ is an intermediate vector component and $\dot{\theta}$ is the rate of change of the elevation angle $\theta$, as shown in FIG. 2, and is one of the desired outputs of transformer 10. Thus, the resolver 12 operates to rotate the components $w_y$ and $w_z$ through the Euler angle $\phi$ so as to obtain the vector components $w_{z2}$ and $\dot{\theta}$, the rate of change of the Euler angle $\theta$. This resolution is illustrated diagrammaticaly in FIGS. 2 and 3. From FIG. 2 it can be seen that:

$$w_{y2} = w_y \cos \theta \pm w_z \sin \theta$$
$$w_{z2} = w_z \cos \theta \mp w_y \sin \theta$$

As shown in FIG. 4, when the output $\dot{\theta}$ is integrated by the integrator 24, a continuous measure of elevation angle $\theta$ of the body 20 with respect to the reference axes X, Y and Z is obtained. This result is fed back to the resolver 14 so that the resolver 14 is also continuuosly resolving its input components $w_{z2}$ and $w_{xs}$, into output components $\dot{\psi}$ and E, where $\dot{\psi}$ is the rate of change of the heading angle $\psi$ and E is an intermediate vector component which is the input to the high gain amplifier 16.

The output component $w_{z2}$ is still displaced relative to the reference Z axis so it is supplied along with $w_{xs}$ as the input components to the resolver 14 which is under the control of the output from integrator 24 so as to resolve the input components to resolver 14 through the angle $\theta$. The resolver 14 thus resolves the component $w_{z1}$ and the output of the summer 18 into an output component $\dot{\psi}$ which after integration by integrator 26 provides a measure of the heading angle $\psi$ of the body with respect to the reference X, Y and Z axes. The resolver 14 also provides the input E to the high gain amplifier 16 whose output is fed back negatively through line 28 to the summer 18.

The summer 18 is interposed between the supply for input component $w_x$ and the resolver 14 so that the input component $w_x$ is first subjected to the action of the summer 18. The summer 18 is supplied with a negative signal which is essentially equal to $\dot{\phi}$, through line 28, which will result in the output component $w_{xs}$ from the summer 18 being equal to $w_x - \dot{\phi}$. The components $w_{xs}$ and $w_{z2}$ are supplied as input components to resolver 14 which resolves these components through the angle $\theta$ resulting in output components E and $\dot{\psi}$. The output component $\dot{\phi}$ from the amplifier 16 represents the rate of change of the bank angle of body 20, which after integration by the integrator 22 provides a measure of the bank angle $\phi$ with respect to the reference X, Y and Z axes.

It has been found that the coordinate transformer 10 will operate to provide Euler angle rates only if that output from resolver 14 which is fed to the high gain amplifier, is almost zero. The necessity for this condition can be mathematically substantiated. Thus, the outputs from integrators 22, 24 and 26 will always provide accurate information on the bank angle elevation angle and heading angle, respectively, of the body 12 with respect to the coordinate frame defined by the X, Y and Z axes. Any suitable apparatus can be utilized for making E go to almost zero. The high gain amplifier 16 illustrated in FIG. 4 is preferred, but it can readily be appreciated that a high gain integrator can be used in place of the high gain amplifier 16, since the integrator will also provide an output such that when fed back to the summer will result in a signal E out of resolver 14 equal to zero.

From the above description it is seen that this invention provides a relatively simple coordinate transformer 10 which is capable of operating continuously to indicate Euler angle rates of changes which can be integrated to provide the bank, elevation and heading angles relative to the reference frame. In the illustrated embodiment of the invention the input signals $w_x$, $w_y$ and $w_z$ to the transformer 10 are body axes components of the angular rate vector. It is to be understood, however, that the input signals, which must be the equivtlent of body axes rate components, can be continuous, discrete, numerical, sampled-data, incremental angles, or whatever is compatible and consistent with the instrumentation and mechanization.

It will be understood that the coordinate transformer which is herein disclosed and described is presented for purposes of explanation and illustration and is not intended to indicate limits of the invention, the scope of which is defined by the following claim.

What is claimed is:

1. Coordinate transformer apparatus for obtaining Euler angle rates of change with respect to predetermined reference axes from signals representing the component angular rates of change of angular position of a body measured along three orthogonal axes fixed with respect to said body, said apparatus comprising first resolver means receiving two signals representing vector components which in turn represent the angular rates of change of said body about two of said body axes, said first resolver means being continuously set to resolve said signals representing vector components into two output components one of which is oriented with respect to said reference axes and the other one of which is an intermediate output component, second resolver means, said second resolver means being connected to said first resolver means for receiving as a first input said intermediate output component from said first resolver means, said second resolver means also receiving a second input, said second resolver means being set to resolve said first and second inputs into a first output component which is oriented with respect to said reference axes and a second output component, feedback means connected to said second resolver means so as to receive said second output component from said second resolver means as an input, summing means connected to and providing said second input for said second resolver means, said summing means being connected to said feedback means and being supplied with an input signal representing said angular rate of change of said body about said third body axis, said feedback means being operable to provide an electrical signal to said summing means which after summing with said input signal to said summing means and resolution in said second resolver means will result in said second output component from said second resolver means being zero or essentially zero.

References Cited

UNITED STATES PATENTS

| | | | |
|---|---|---|---|
| 3,049,298 | 8/1962 | Barber et al. | 235—150.2 |
| 2,723,800 | 11/1955 | Marner | 235—186 |
| 3,015,446 | 1/1962 | Ville et al. | 235—189 |
| 3,078,042 | 2/1963 | Grado | 235—187 |
| 3,131,292 | 4/1964 | Tobin | 235—186 X |
| 3,331,951 | 7/1967 | Webb | 235—186 X |

FOREIGN PATENTS

| | | |
|---|---|---|
| 775,984 | 5/1957 | Great Britain. |
| 945,255 | 12/1963 | Great Britain. |

MALCOLM A. MORRISON, Primary Examiner

ROBERT W. WEIG, Assistant Examiner

U.S. Cl. X.R.

235—150.2